Oct. 11, 1966 D. E. CHAPIN 3,278,867

COMPACT ULTRASONIC STRIP DELAY LINE HAVING
SHARP BEND IN DELAY MEDIUM
Filed Aug. 27, 1963

INVENTOR
D. E. CHAPIN
BY Roy M. Porter, Jr.
ATTORNEY

United States Patent Office 3,278,867
Patented Oct. 11, 1966

3,278,867

COMPACT ULTRASONIC STRIP DELAY LINE HAVING SHARP BEND IN DELAY MEDIUM

Donald E. Chapin, Morris Plains, N.J., assignor to Bell Telephone Laboratories Incorporated, New York, N.Y., a corporation of New York Filed Aug. 27, 1963, Ser. No. 304,877
2 Claims. (Cl. 333—30)

This invention relates to delay devices and more particularly to ultrasonic delay lines of compact and space-saving physical configuration.

The potential value of several different forms of ultrasonic delay line for use in pulse systems of numerous types is being increasingly appreciated, and new applications for these lines are regularly being proposed. However, one serious limitation upon their practical usefulness is their physical size, bulk and general physical awkwardness. These limitations are particularly critical in applications such as large capacity memories where many delay lines must be assembled to store the desired amount of information.

One of the preferred forms of delay line from this standpoint is the strip delay line which takes the form of a long, wide, thin strip capable of being coiled into a spiral and capable of being operated in several different modes of vibration. Such a line is disclosed in A. H. Meitzler Patent 3,041,556, granted June 26, 1962. While having considerable advantage over other forms which must be held straight, rigid, or under tension, the spiral strip delay line still requires considerable space and one transducer must be inconveniently located at the center of the spiral.

It is therefore an object of the present invention to improve the form and compactness of strip delay lines.

The present invention is based upon the surprising discovery that the thickness-shear mode of propagation upon a strip line can traverse a sharp 180 degree bend about the width dimension of the strip with substantially no attenuation or mode degeneration. This property appears to be unique for this mode among all other possible modes of elastic vibration. It is therefore proposed, in accordance with the present invention, to fold or bend a strip delay line sharply at one point along its length, provide it with thickness-shear mode transducers, and then roll it bifilarly about the bend into a tight, compact coil. Both transducers thus appear upon the circumference of the roll providing easy access for connection and repair.

Figure 1:
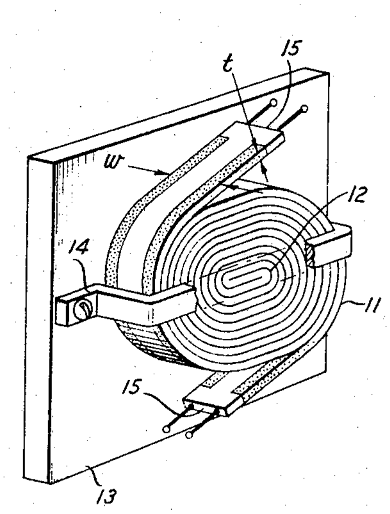
Figure 2:
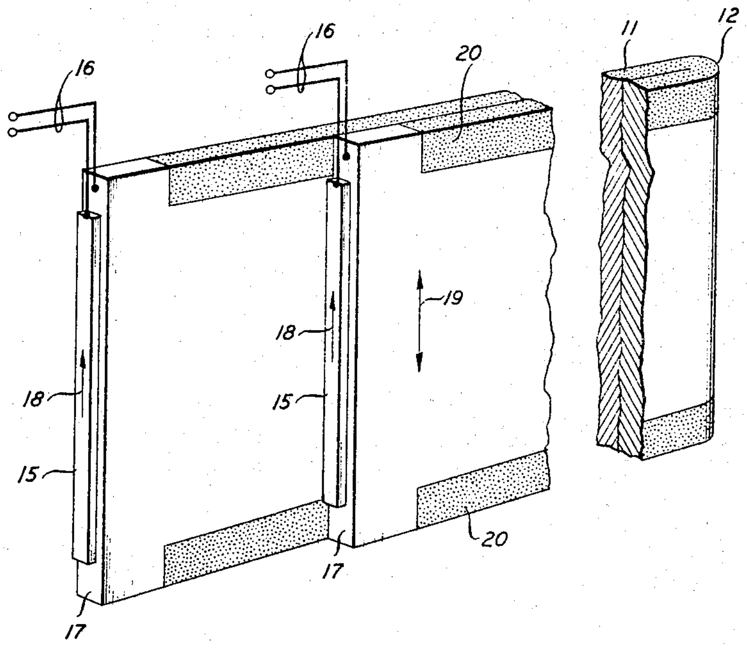

These and other objects, the nature of the present invention, and its features will become more apparent upon consideration of the following detailed description taken in connection with the drawings in which:

FIG. 1 is a perspective view of a delay line system in accordance with the present invention; and FIG. 2 is an enlarged fragmentary view of the delay line of FIG. 1 in an uncoiled condition in order to show details of the transducers.

Referring more particularly to FIG. 1, an illustrative embodiment in accordance with the invention comprises a strip of delay material 11 having a width dimension *w* that is substantially greater than its thickness dimension *t*. The line may be formed of any nonbrittle, isotropic material such as aluminum or of a polycrystalline metallic alloy provided the grain size of the alloy is small compared with the wavelength of the elastic wave motion to be conducted by the strip. Strip 11 is bent back upon itself sharply about its width dimension at a point 12 approximately in the center of its length. Bend 12 may be crimped tightly with a vise or pliers to produce a complete 180 degree bend. Strip 11 is then rolled tightly in a bifilar manner starting with bend 12 at the center of the spiral and continuing back toward the two ends to constitute a compact package. The roll may then be rigidly mounted by any suitable means which contacts only the narrow or minor edges of strip 11 since these edges are dead surfaces. As illustrated, suitable mounting means comprises a baseboard 13 and an offset bracket or clamp 14 although much more sophisticated mountings will readily occur to those skilled in the art. Transducers 15 and 15, the nature of which will be described hereinafter, are bonded to the face of each end of strip 11 by conventional techniques. A particular feature of the invention is apparent in that both transducers are located upon the outer region of the delay line coil. They may be used interchangeably as output and input transducers, respectively.

FIG. 2 shows an enlarged fragmentary view of strip 11 in an uncoiled condition from which the sharpness of bend 12 may be clearly seen and the details of the transducer may be examined. Thus, transducer 15 or 16 may be of one of the several designs known to produce a thickness-shear mode of elastic vibration on strip 11. For example, transducers 15 and 15 may each be Y-cut piezoelectric crystals or may each be thickness-shear mode $BaTiO_3$ ceramic transducers appropriately bonded to the end faces 17 of strip 11. In either case the transducers are properly poled as represented by arrows 18 in a direction perpendicular to the length axis of strip 11 and parallel to the major surfaces thereof. Such a transducer produces a wave vibration in strip 11 for which each particle 19 moves perpendicular to the length axis and parallel to the direction of poling in the transducer. Such a vibration is familiar to the art and is commonly designated as the "thickness-shear mode." Further details concerning this mode, the effect of the dimensions of the strip line upon the mode characteristics and details of transducer construction which are not of concern here, may be found in the above-mentioned patent of A. H. Meitzler.

Reflections of wave motion from the minor surfaces of strip 11 and cross coupling between adjacent turns of the spiral would produce undesirable interactions. This is prevented in accordance with the invention by coating or covering the minor surfaces as well as the immediately adjacent edges of the major surfaces of strip 11 with absorber 20 which may take the form of a cloth or plastic-backed adhesive tape folded over the edges of strip 11.

In accordance with the invention the thickness-shear mode, and only this mode of vibration, can negotiate bend 12 without either mode degeneration or energy loss. In addition, no energy is lost or mode conversion takes place as a result of reflections from the major surfaces. A possible explanation of both effects resides in the fact that particle motion for this mode of vibration as presented by the vector associated with point 19 in FIG. 2 is in a direction parallel to the major surfaces and perpendicular to the plane of the bend so that the major surfaces guide the wave motion around the bend with no reflection or energy loss. Thus wave energy launched by one transducer travels the spiral curve into the center of the coil, negotiates bend 12 and returns on the interleaved turns of the spiral to the other transducer wherein the shear vibration is converted into electrical energy.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A delay line comprising an elongated thin strip of ultrasonic transmission material, said strip having a rectangular cross-section with a width dimension many times that of the thickness dimension, said strip being bent substantially 180 degrees along its length and being wound bifilarly about said bend in the form of a spiral with said bend in the center of said spiral and with both ends of said strip on the outside of said spiral, and transducer means mounted on each end of said strip for generating and responding to thickness-shear modes of elastic wave motion in said strip.

2. A delay line comprising an elongated thin strip of ultrasonic transmission material, said strip being bent substantially 180 degrees at a point between its ends, said strip being bifilarly wound in the form of a spiral from said point towards said ends, and transducer means mounted on each of said ends for generating and responding to elastic wave motion in said strip in which the individual particle motion in said strip is parallel to the major surfaces of said strip and therefore is normal to the plane of said bend.

References Cited by the Examiner

UNITED STATES PATENTS

| | | | |
|---|---|---|---|
| 2,853,145 | 9/1958 | Martin | 333—30 |
| 2,994,829 | 8/1961 | Hopper | 333—30 |
| 3,041,556 | 6/1962 | Mertzler | 333—30 |

FOREIGN PATENTS

| | | |
|---|---|---|
| 540,145 | 5/1957 | Canada. |

HERMAN KARL SAALBACH, *Primary Examiner.*

C. BARAFF, *Assistant Examiner.*